INVENTOR.
HARRY SHAW
GEORGE S. BLAIR

May 5, 1970  G. S. BLAIR ET AL  3,509,849
MOLTEN ADHESIVE DISPENSING APPARATUS
Filed Feb. 12, 1968  5 Sheets-Sheet 2

INVENTOR.
HARRY SHAW
GEORGE S. BLAIR
BY
Douglas S. Johnson
Attorney

INVENTOR.
HARRY SHAW
GEORGE S. BLAIR

BY

Douglas S. Johnson

Attorney

United States Patent Office

3,509,849
Patented May 5, 1970

---

3,509,849
MOLTEN ADHESIVE DISPENSING APPARATUS
George S. Blair, 17 Flaremore Crescent, Willowdale, Ontario, Canada, and Harry Shaw, 37 Glass Drive, Aurora, Ontario, Canada
Continuation-in-part of application Ser. No. 491,302, Sept. 29, 1965. This application Feb. 12, 1968, Ser. No. 705,886
Claims priority, application Canada, Aug. 21, 1965, 938,808
Int. Cl. B05c *11/12*
U.S. Cl. 118—6          3 Claims

---

ABSTRACT OF THE DISCLOSURE

A container holding glue, has a series of holes in the bottom; plungers, aligned with the holes, reciprocate in the container and on their downward movement force glue through the holes on to a wrapping paper travelling beneath the container. The travel of the plungers terminates when their ends reach the bottom surface of the container. Synchronized with the downward movement of the plunger is a mechanism which lifts the wrapping paper into contact with the bottom of the container.

---

CROSS-REFERENCES TO RELATED APPLICATIONS

This application is a continuation-in-part of my co-pending application Ser. No. 491,302, filed Sept. 29, 1965 and now abandoned.

BACKGROUND OF THE INVENTION

Field of the invention

This invention relates to apparatus for dispensing instermittently predetermined quantities of liquid adhesive and has particular reference to dispensing predetermined quantities of liquid adhesive onto a moving sheet of wrapping paper which is subequently folded on itself to provide a sealed cover for a bundle of newspapers.

Description of the prior art

In U.S. patent application S.N. 151,943 now abandoned there is described apparatus which consists of one or more expanding cages which bundle in circular manner flexible planar articles such as newspapers; to delineate each paper from the next in such a bundle and also to provide overall protection it is customary to feed a sheet of wrapping paper along with the feed of newspapers and after bundling is completed the length of wrapping paper is severed to provide an extension which is then folded over the underlying turn and glued thereto in order to seal the bundle.

Hitherto it has been found difficult to apply liquid adhesive transversely and intermittently to a wrapping paper at predetermined locations and specified quantities because the wrapping paper is moving at a considerable speed. Furthermore, it has been found difficult to prevent accumulation and consequent deterioration of the molten adhesive on the dispensing surface which is momentarily in contact with the wrapping paper.

It is an object of the invention to provide apparatus which dispenses intermittently predetermined quantities of molten adhesive to the surface of a moving sheet of wrapping paper without accumulation of solid adhesive to the dispensing surface.

SUMMARY OF THE INVENTION

The apparatus of the invention comprises a first chamber containing adhesive which is maintained where necessary in the molten condition by the application of heat to the chamber, the opposed top and bottom walls of the first chamber being provided with a plurality of spaced apart aligned apertures. Slidably engaged in each pair of aligned apertures, to provide a seal, is a plunger which is reciprocably movable whereby its lower end is withdrawn in the chamber for a predetermined period of time after which it is again lowered with the result that a predetermined quantity of liquid adhesive is forced out through the lower aperture onto the wrapping paper passing below the chamber.

In a preferred embodiment and particularly when wrapping newspapers means are provided which urge the wrapping paper against the undersurface of the lower wall at the moment when the lower ends of the plungers are actuating a predetermined quantity of liquid adhesive through the apertures; as a result the undersurface of the lower wall is wiped clean in readiness for the application of the next series of adhesive points.

It is a further feature of the invention that a second chamber is provided which communicates with the first chamber through a narrow passage, the second chamber being designed to act as a reservoir for solid adhesive and is heated so that only the adhesive in the lower part of the second chamber is maintained in a liquid condition.

BRIEF DESCRIPTION OF THE DRAWINGS

The invention will now be described with reference to the accompanying drawings, in which.

DESCRIPTION OF THE PREFERRED EMBODIMENT

Figure 1:
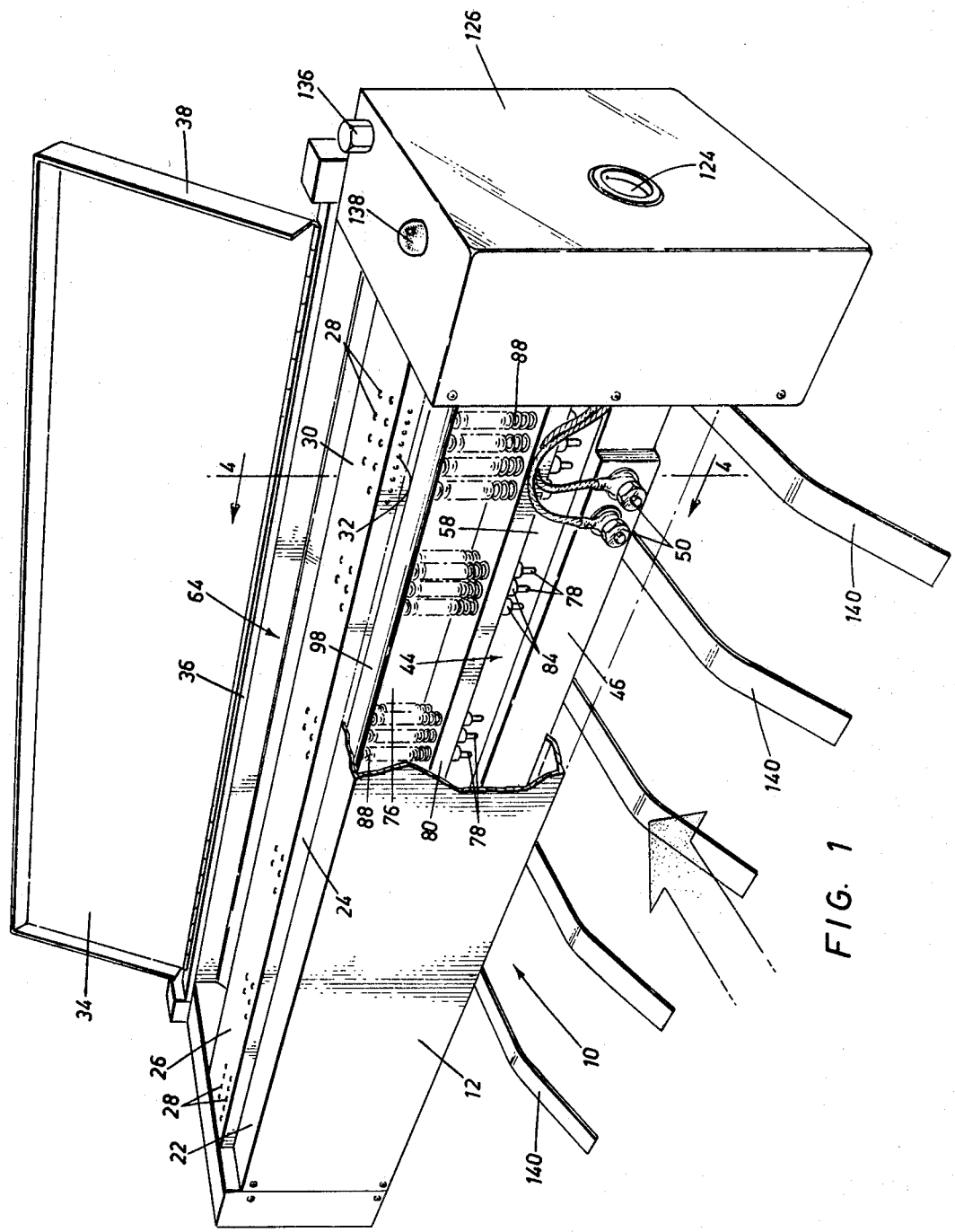
FIG. 1 is a perspective view of the apparatus with part of the front wall removed.
Figure 2:
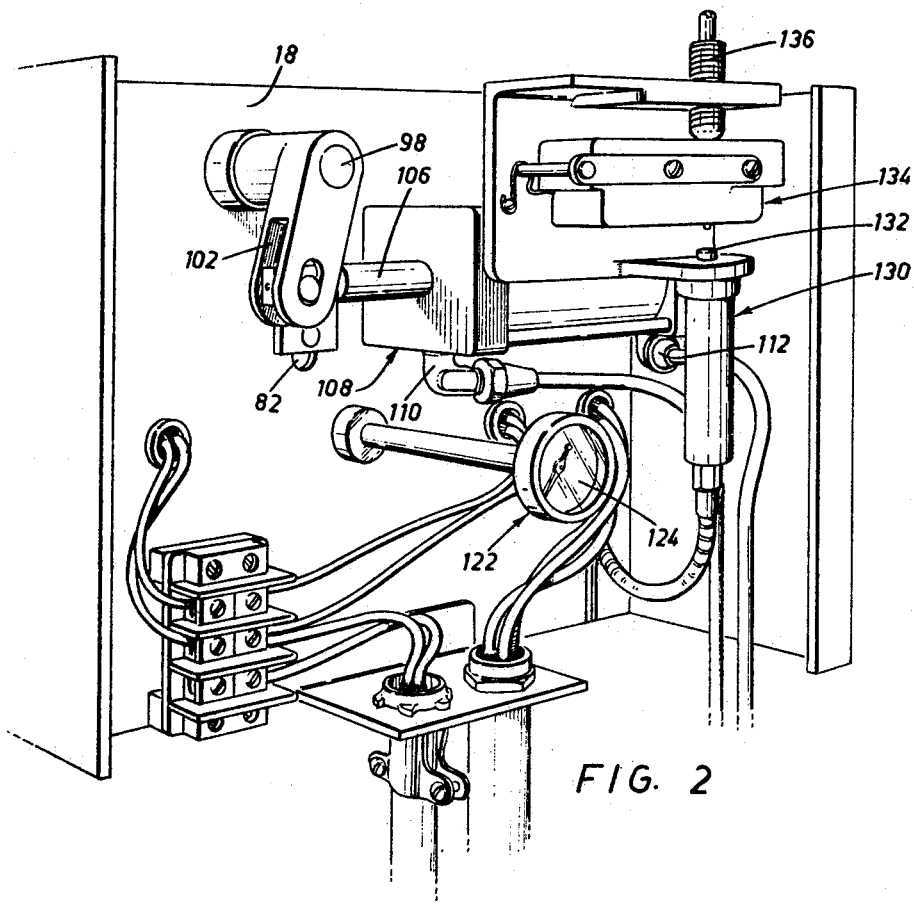
FIG. 2 is a perspective view of one end of the apparatus with the cover plate removed.

The apparatus according to the invention is supported in a container, generally denoted by the numeral 10, which includes a front wall 12 and a back wall 14, the connotation "front" and "back" being used in relation to the direction of movement of the wrapping paper 16 which normally travels below the lower ends of the front wall 12 and the back wall 14. The opposed end walls 18 and 20 connect the front wall 12 and the back wall 14, the distance between the end walls 18 and 20 being somewhat greater than the width of the wrapping paper 16. The upper end of the front wall 12 terminates short of the upper ends of the end walls 18 and 20 and turned inwards to provide a ledge or shelf 22 which extends some distance towards the back wall 14. The inner end of the ledge 22 abuts the lower edge of the vertical face 24 of a substantially rectangular member 26, the ends of which are also secured to the end walls 18 and 20.

For purposes to be described later the exposed vertical face 24 of the rectangular member 26 is provided with a series of spaced apart apertures 28 and the horizontal face 30 of the rectangular member 26 is provided with another series of spaced apart apertures 32 which communicate with the apertures 28. A cover 34 is hinged to a longitudinal post 36 secured to the back wall 14; the cover 34 is provided with a rim 38 which rests on the top of the end walls 18 and 20 and also on the rectangular member 26 but covering the apertures 32 and thus providing a space above.

The lower end of the front wall 12 is bent inwardly towards the back wall 14 to provide a downwardly sloping extension 40 whilst the lower end of the back wall 14 is bent forwardly and then downwardly to provide another extension 42. The ends of the extension 40 and 42 bear against a first chamber, generally denoted by the numeral 44, the ends of which are secured to the end walls 18 and 20.

The first chamber 44 contains adhesive preferably of the type which has to be melted in order to render it liquid since such molten adhesive adheres far quicker than that which is liquid at room temperature. To maintain the adhesive in the molten form resistance heating plates 46 and 48 respectively face the front and back of the first chamber 44; the plates 46 and 48 are provided with power supply terminals 50. The undersides of the front and back plates 46 and 48 are shaped to provide a continuation of the downwardly sloping extensions 40 and 42 respectively.

The undersides of the front and rear ends of the lower wall 52 of the first chamber 44 also taper downwardly in line with the extensions 40 and 42 towards a central portion 54 having a substantially horizontal undersurface which is thereby positioned closer to the wrapping paper 16 than any part of the container 10.

For purposes to be explained later the central portion 54 of the lower wall 52 is provided with a plurality of spaced apart apertures 56 which are aligned with the vertical apertures 32 of the rectangular member 26, the diameter of the apertures 56 being normally smaller than that of the apertures 28. The upper wall 58 of the first chamber 44 is also provided with a plurality of apertures 60 which are in line with the apertures 28 and are of the same diameter. The first chamber 44 also has a horizontal rearwardly extending channel 62 which then extends upwardly and outwardly of the upper wall 58 of the chamber 44.

A second chamber 64 is positioned in the container 10 above the first chamber 44; the upper portion of the rear wall 66 is secured to the back wall 14 whilst a mid portion 68 slopes forwardly and downwardly to terminate in a short vertical portion 70 which is then joined to a short horizontal portion 72, which contains a recess 74 communicating with the channel 62. The second chamber 64 is completed by an upwardly extending forward wall 76 which is secured at its upper end to the rectangular member 26.

The upper portion of the heating resistance plate 48 bears against the outer surface of the wall portion 70 of the second chamber 64 thereby providing a means of melting the adhesive only in the lower part of the second chamber 64, the upper part remaining solid thus minimizing the loss of heat and providing more amenable working conditions.

Positioned forwardly of the wall 76 of the second chamber 64 are a plurality of vertically disposed plungers 78 each of which is slidably engaged in one of the apertures 28 of the rectangular member 26. The plungers 78 extend downwardly into the first chamber 44 being slidably engaged in corresponding apertures 60 in the upper wall 58 and also in the apertures 56 in the mid portion 54 of the lower wall 52. As indicated more particularly in FIGURE 4 the lower ends of the plungers 78 are reduced in diameter to accord with the reduced diameter of the apertures 56 in the lower wall 52.

The plungers 78 ride in a horizontally disposed bar 80, the respective ends of which are located in vertical slots 82 provided in the end walls 18 and 20. The bar 80 is positioned above the chamber 44 being movable in a vertical plane and thereby in the slots 82 by a mechanism described below.

Immediately below the bar 80 and individual to each plunger 78 is a collar 84 which is adjustably secured to the plunger 78 by means of a grub screw 86. Individual to each plunger 78 and with its lower end resting on the upper surface of the bar 80 is a spring 88, the upper end of which bears against another individual collar 90 which is also adjustably secured to the plunger 78 by means of a grub screw 92. The collar 90 is positioned some distance below the rectangular member 26 and on movement upwards of the bar 80 the pressure on the lower end of each of the plungers 88 will move the plungers 78 upwards whereby their upper ends will travel into the space provided below the cover 34. The length and upward movement of the plungers 78 is such that their lower reduced ends are completely withdrawn from the apertures 56 in the central lower wall portion 54 of the first chamber 44. On the other hand when the bar 80 is lowered the pressure is transferred to the collar 84 and the plungers 78 will travel downwards so that their reduced ends will slide back into the respective apertures 56; the travel is adjusted so that the movement of the lower end of the plungers 78 is terminated flush with the undersurface of the central portion 54 of the chamber 44.

Figure 4:
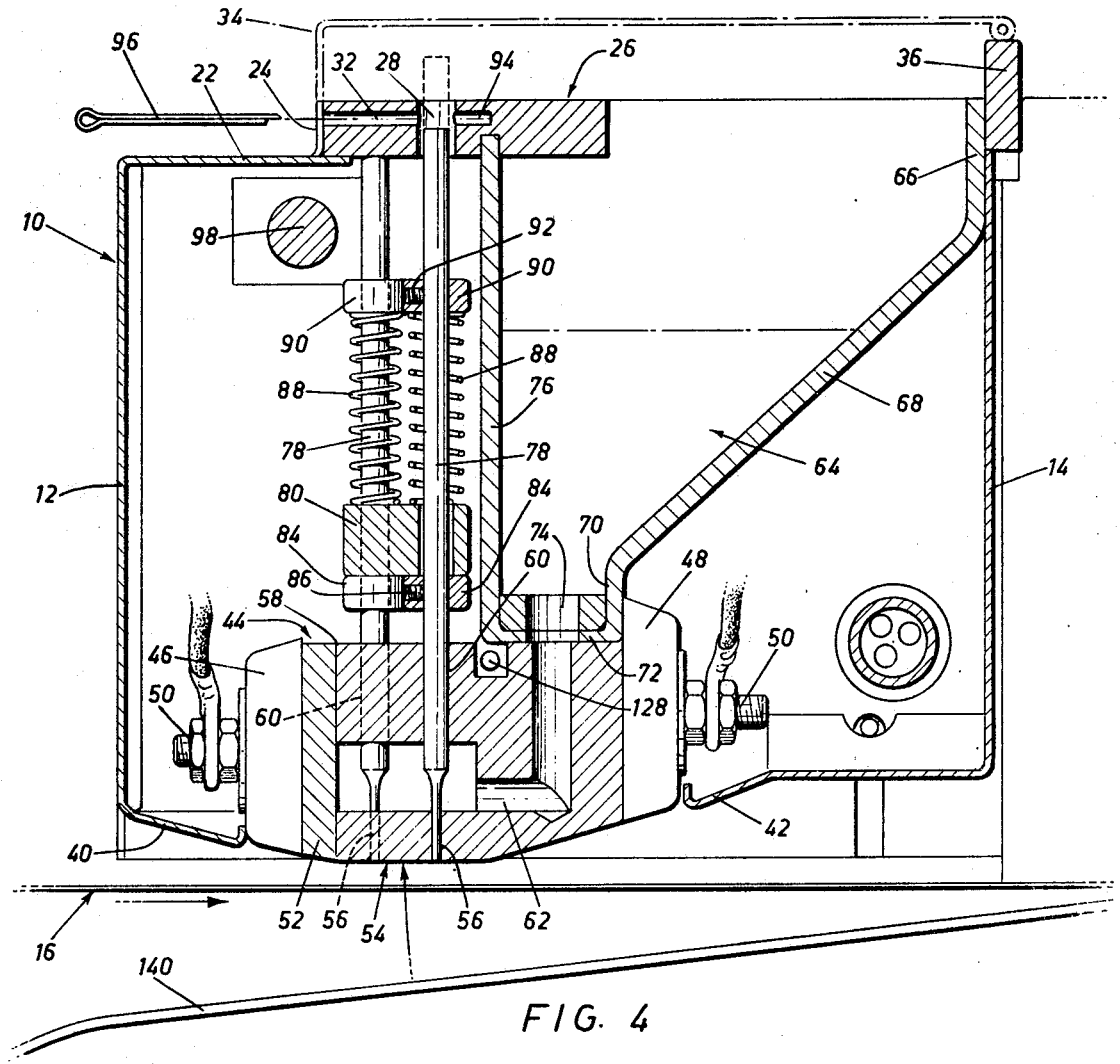
FIG. 4 is a cross sectional view taken on the lines 4—4 of FIG. 1.

As shown in FIG. 4 each of the plungers 78 is provided with a slot 94 adjacent its upper end. An individual cotter pin 96 may be inserted in the slot 94 of selected plungers 78 to prevent their movement. In this manner the application of adhesive at points on the wrapping paper 16 can be selected at will.

Figure 5:
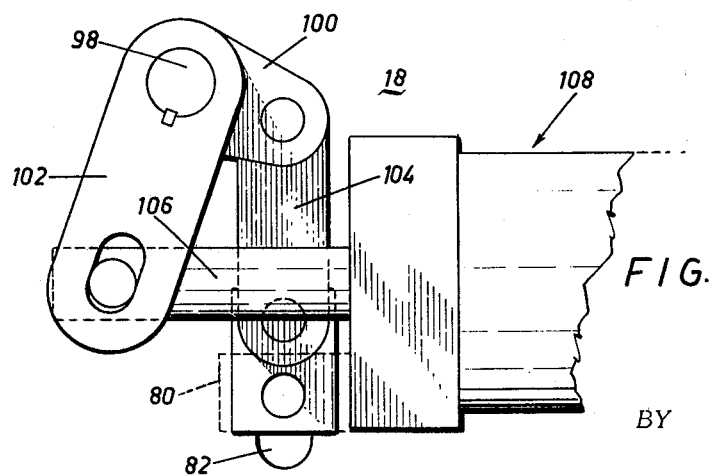
FIG. 5 is a sectional view of the linkage for actuating the plungers which dispenses the molten adhesive.

The mechanism for moving the rectangular bar 80 and hence the plungers 78 includes a shaft 98 journalled through the end walls 18 and 20 and positioned above the rectangular bar 80 as illustrated more particularly in FIG. 5. Exterior of the end wall 18 and secured to the shaft 98 in fixed relation thereto are a pair of depending arms 100 and 102 which subtend a fixed angle to each other as illustrated more particularly in FIG. 5. The lower end of the arm 100 is pivoted to a link arm 104 which, in turn, is pivotably secured to the rectangular bar 80 which rides in the slot 82. The lower end of the other arm 102 is pivotably secured to the free end of a piston 106 which is reciprocably movable in a horizontally disposed cylinder 108. Conduit 110 and 112 are connected at opposite ends to the cylinder 108, the conduits 110 and 112 leading to a relay controlled compressed air supply, not shown. When the relay is in one position compressed air flows through the conduit 110 thus activating the piston 106 in the rearward direction with the result that the lower end of the arm 100 is also moved in the same direction and due to its fixed relation the arm 102 rotates upwards thereby raising the rectangular bar 80 in the slot 82. Reversal of the relay causes the compressed air supply to enter through the conduit 110 with the result that the piston 106 moves forwardly and the rectangular bar 80 is lowered in the slot 82.

Figure 3:
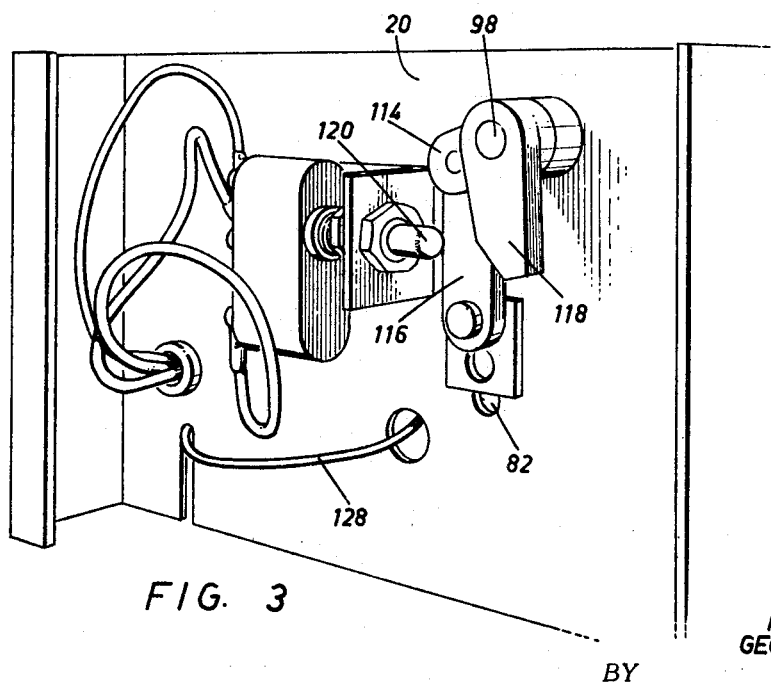
FIG. 3 is a perspective view of the other end of the apparatus with the cover plate removed.

An arm 114 and a link 116 similar in construction to the arm 100 and the link 104 already described are secured to the other end of the rectangular bar 80 journalled through the end wall 20; also secured to this end of the rectangular bar 80 is an arm 118 which subtends a constant angle to the arm 114 as illustrated more particularly in FIG. 3. The rotation of the shaft 98 consequent on rearward movement of the piston 106 causes the arm 118 to move in a rearward direction where it strikes a switch 120 which activates the relay in the compressed air system thereby reversing the flow of air in the cylinder 108 causing the piston 106 to move in the opposite direction.

A temperature indicating device 122 extends outward from the first chamber 44 through the end wall 18, the dial 124 being supported in the cover 126 surrounding the end wall 18. An expansion temperature sensing element 128 extends the length of the first chamber 44, the element 128 being connected to a conventional expansion chamber 130 supported by the end wall 18 inside the cover 126. A plunger 132 protrudes from the expansion chamber 130, the plunger 132 being movable due to expansion towards a switch 134 which terminates the current being supplied to the heat resistance plates 46 and 48. An adjusting screw 136 is positioned in the cover plate 126, the lower end of the adjusting screw 136 bearing against the contact 134, the adjustment, of course, being made with reference to the temperature value shown on the dial 124. A pilot light 138 is provided at the top of the cover plate 126 to show when the power is being supplied.

It will be appreciated that the moving wrapping paper 16 may be maintained in contact with the undersurface of the central portion 54 of the lower wall 52, the liquid adhesive being applied by the plungers 78 when required. However, as mentioned earlier the apparatus is particularly designed to operate in conjunction with that shown in U.S. patent application S.N. 151,943 in which case the wrapping paper 16 on which the newspapers are travelling normally moves in a plane some distance removed from the central portion 54. In order to apply the adhesive it is necessary to lift the wrapping paper 16 against the central portion 54 of the lower wall 52 and this is achieved by the mechanism illustrated in FIG. 6. The wrapping paper 16, which is shown as pressed against the central lower wall portion 54 of the container 10, travels towards the latter by means of a conveyor platform 140 which terminates substantially in the vertical plane of the front wall 12 of the container 10.

The upper flange 142 of a channel member 144 is secured to the underside of the platform 140 in a position to provide an overhanging portion 146. The lower flange 148 of the channel member 144 carries a plate 150 which has an integral downwardly projecting apertured extension 152. The forward end of a cylinder 154 is secured to the extension 152 and a piston 156 projects through the aperture of the extension 152, the piston 156 extending therefrom in the direction of travel of the wrapping paper 16.

An abutment 158 is secured to the base 160 of the channel member 144, the abutment 158 being positioned below the overhanging of an angle member, which provides integral arms 164 and 166, is pivotably mounted on the abutment 158 so that clockwise rotation of the hub 164 is terminated by its contact with the undersurface of the overhanging portion 146 of the platform 140.

The free end of the arm 164 has a spindle 168 on which is mounted a roller 170 dimensioned so that its surface projects outwardly of the arm 164. The midportion of the lower arm 166 has an integral pin 172 in which is journalled a yoke 174 secured to the free end of the piston 156. One end of a spring 176 is secured to the free end of the lower arm 166, the spring 176 extending therefrom in a direction opposed to that of the travel of the wrapping paper 16. The spring 176 thus urges the hub 162 to rotate clockwise, lowering the arm 164 to the broken line position shown in FIG. 6. Actuation of the piston 156 rotates the arm 164 in the opposite direction thus raising the wrapping paper 16 to the position where it presses against the central lower portion 54 of the container 10.

Figure 6:
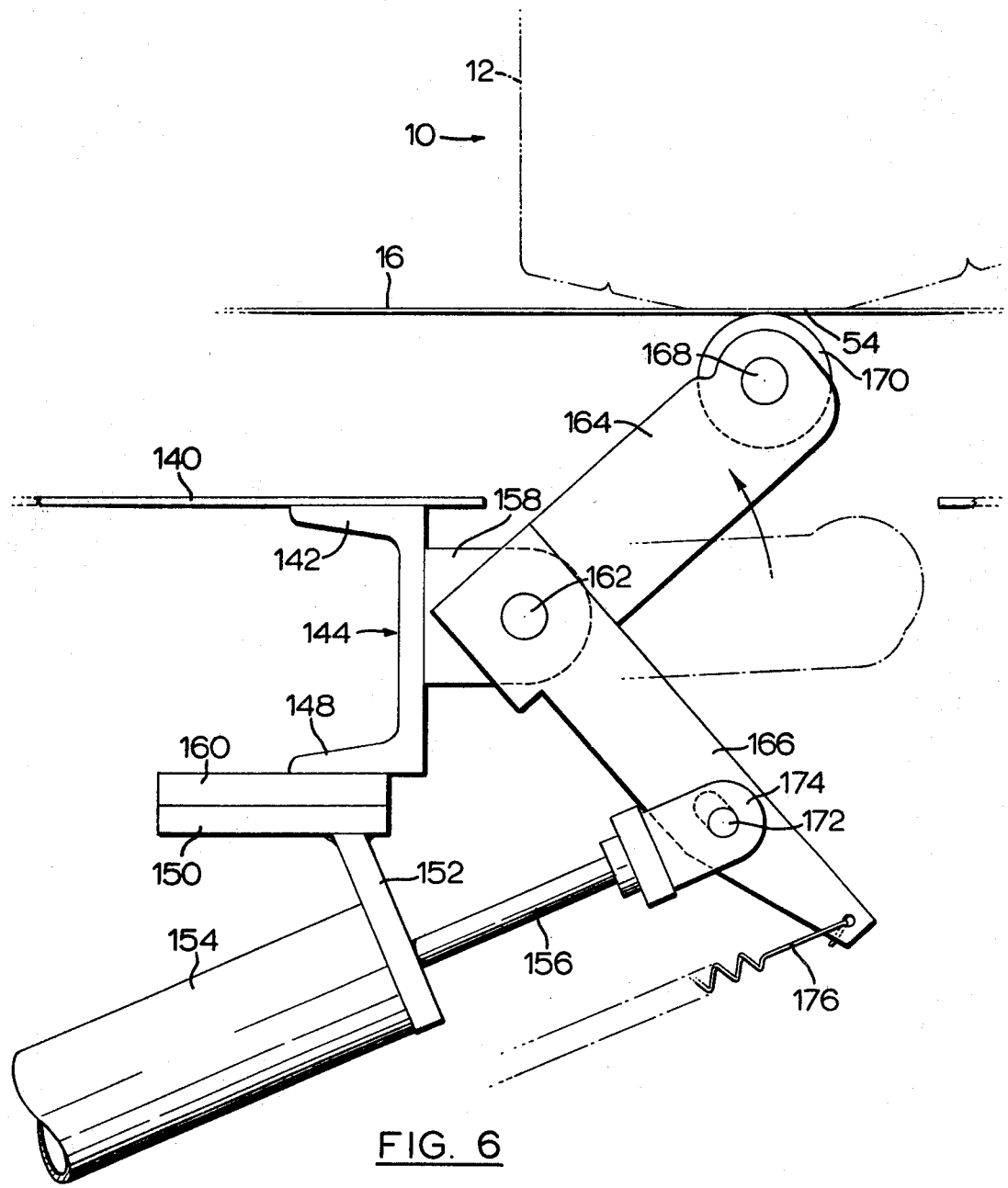
FIG. 6 illustrates a preferred embodiment of a mechanism for lifting the wrapping paper against the lower wall of the dispensing apparatus.
Figure 7:
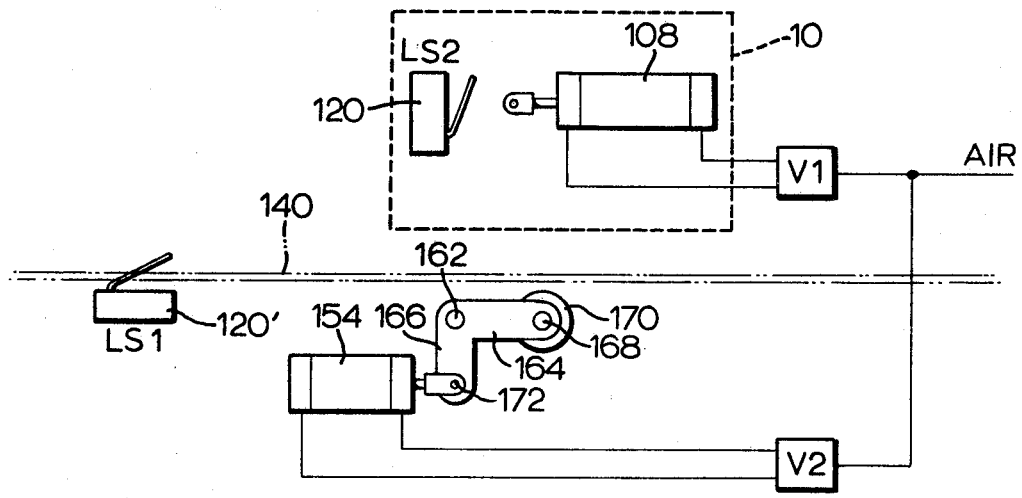
FIG. 7 illustrates the linkage between the mechanism shown in FIG. 6 and the cylinder activating the dispensing plungers.
Figure 8:
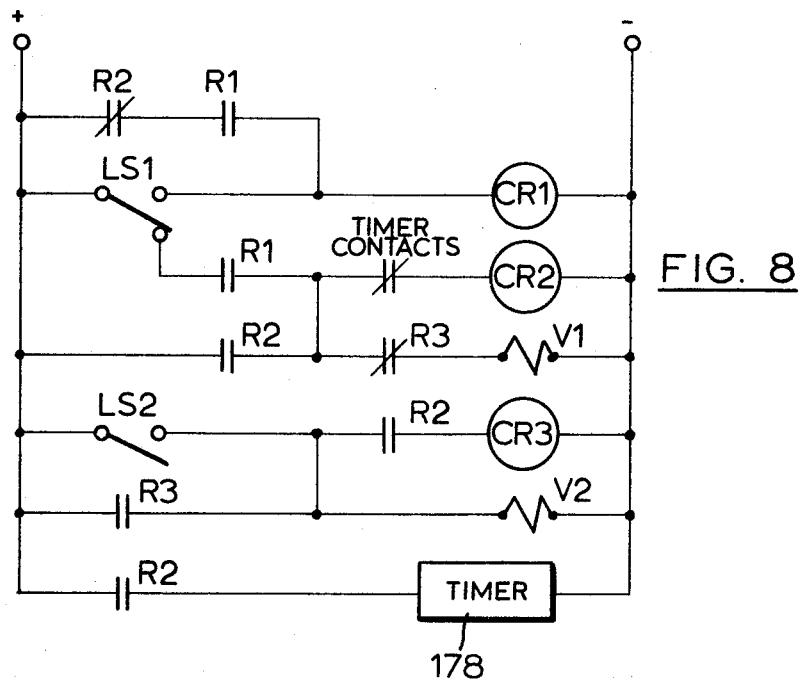
FIG. 8 is a preferred embodiment of a control circuit for operating the mechanism shown in FIG. 6.

The cylinder 154, which activates the raising mechanism illustrated in FIG. 6 is connected to the cylinder 108 through solenoid operated four-way air valves V1 and V2 as illustrated in FIG. 7. Limit switches LS1 and LS2 are employed in the position shown in FIG. 7. CR1, CR2 and CR3 are control relays, the connections to which are shown in FIG. 8. At energization the timer 178 will open its contact after a preset time delay, after which the sequence of events is as follows:

A wrapped article on the conveyor 16 trips LS1 which energizes CR1 which locks in through the normally closed R2 contacts. As the wrapper leaves LS1 the switch resets and is now able to energize CR2 through the now closed R1 contacts and the normally closed timer contacts. When CR2 is energized, V1 is also energized through the normally closed R3 contacts, the timer starts its cycle and CR1 is de-energized ready for the next cycle. With V1 energized the plungers are lifted by the plunger cylinder and as they reach their upper position, LS2 is tripped. When LS2 is tripped, CR3 is energized through R2 contacts and locks in through normally open R3 contacts which also energize V2, thus bringing the lifting rolls up against the undersurface of the dispenser. At the same time CR3 de-energizes V1, allowing the plunger to reset and deliver a measured amount of glue. The timer then completes its cycle and opens the contacts at CR2 and CR2 is deenergized. This, in turn, de-energizes CR3 and the timer. The cycle is now complete.

The operation of the apparatus when wrapping newspapers will be obvious from the above description, with the plungers 78 being normally in the lowered positions to seal the apertures 56 whilst the newspapers are travelling below towards the bundling apparatus; on completion of the bundling the wrapping paper 16 is severed to leave a projecting portion at which time the plungers 78 are withdrawn and then lowered through the apertures 56 simultaneously with the lifting of the wrapping paper 16 to contact the central portion 54 of the lower wall 52. It will be appreciated that the plungers 78 will only move when the adhesive is in the liquid or molten condition and there is no possibility of breakage should the adhesive be solidified due to power failure.

We claim:

1. Apparatus for dispensing liquid adhesive onto a planar article disposed below said apparatus including a chamber for holding said adhesive, said chamber including opposed apertured top and bottom walls, the undersurface of said bottom wall being smooth, a plurality of plungers each engageable in a respective pair of apertures in said top and bottom walls, means for reciprocally moving said plungers in said apertures whereby the lower ends of said plungers are retracted into said chamber and then advanced only as far as said undersurface of said bottom wall to force a predetermined amount of said liquid adhesive through said apertures in said bottom wall onto said planar article and below said moving sheet of paper, means movable in an upward direction to press said paper against said lower wall in response to the downward movement of said plungers.

2. Apparatus according to claim 1 wherein stop means individual to each plunger are provided to prevent selected plungers from movement.

3. Apparatus according to claim 1 wherein the means for reciprocally moving said plungers comprises a first collar individual to each of said plungers and secured to a portion of said plunger extending upwards of said top wall, a member upwardly movable along said plunger above said first collar, a spring surrounding said plungers with its lower end bearing against said member, a second collar individual to each of said plungers and secured to said plunger above the upper end of said spring and means for moving said member upwardly.

References Cited

UNITED STATES PATENTS

| | | | |
|---|---|---|---|
| 449,670 | 4/1891 | Denney | 118—415 |
| 1,242,137 | 10/1917 | Bullard | 222—510 X |
| 1,471,475 | 10/1923 | Demuth | 222—510 X |
| 1,471,476 | 10/1923 | Demuth | 222—510 X |

(Other references on following page)

UNITED STATES PATENTS

| | | | |
|---|---|---|---|
| 1,652,409 | 12/1927 | Moulthrop | 222—510 X |
| 2,839,024 | 6/1958 | Maynard | 118—415 X |
| 2,957,440 | 10/1960 | Schaefer | 222—510 X |
| 3,030,915 | 4/1962 | Shannon. | |
| 3,146,126 | 8/1964 | Baker. | |
| 3,185,129 | 5/1965 | Sollich | 118—315 X |
| 3,286,689 | 11/1966 | Ziemba | 118—411 |

WALTER A. SCHEEL, Primary Examiner

J. P. McINTOSH, Assistant Examiner

U.S. Cl. X.R.

118—2, 411